United States Patent [19]
Oshima et al.

[11] Patent Number: 6,150,007
[45] Date of Patent: *Nov. 21, 2000

[54] FUSED DECORATIVE SHEET

[75] Inventors: Masahiro Oshima; Hiroshi Sasaki, both of Osaka, Japan

[73] Assignee: Meiwa Gravure Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/996,406

[22] Filed: Dec. 22, 1997

[30] Foreign Application Priority Data

Aug. 8, 1997 [JP] Japan .................................. 9-215343

[51] Int. Cl.[7] ............................................................ B32B 3/00
[52] U.S. Cl. ........................ 428/161; 428/172; 428/187; 428/205
[58] Field of Search ......................................... 428/161, 163, 428/172, 174, 187, 207, 213, 542.2, 913.2, 204, 203, 904.4

[56] References Cited

U.S. PATENT DOCUMENTS

| | | | |
|---|---|---|---|
| 4,093,766 | 6/1978 | Scher et al. | 428/165 |
| 4,210,693 | 7/1980 | Regan et al. | 428/152 |
| 4,310,370 | 1/1982 | Arai et al. | 156/220 |
| 4,407,881 | 10/1983 | Shima et al. | 428/156 |

FOREIGN PATENT DOCUMENTS

| | | |
|---|---|---|
| 3-33500 B2 | 5/1991 | Japan . |
| 4-55851 B2 | 9/1992 | Japan . |

*Primary Examiner*—Nasser Ahmad
*Assistant Examiner*—Derek Jessen
*Attorney, Agent, or Firm*—Kubovcik & Kubovcik

[57] ABSTRACT

A multicolor fused decorative sheet in which a colored first synthetic resin layer with translucence and a colored second synthetic resin layer with translucence are laminated, the first synthetic resin layer and the second synthetic resin layer differ in colors, and concavity and convexity are formed to form the specified patterns, and its manufacturing method and manufacturing apparatus.

20 Claims, 11 Drawing Sheets

FUSED DECORATIVE SHEET

BACKGROUND OF THE INVENTION

The present invention relates to a multicolor fused decorative sheet used for a shower curtain, window affixed sheet, table runner, table cloth, substrate for bag, and so on and the manufacturing method and manufacturing apparatus thereof.

Hitherto, this kind of decorative sheet has a pattern printed or surface unevenness formed by embossing on the front or rear surface of a synthetic resin sheet to improve design characteristics. Further, bottom dye printing and top dye printing using an emboss roll are known, and in addition to these, there is a chemical embossing method for forming concave and convex patterns on the synthetic resin sheet with printing ink with a foam inhibitor such as trimellitic acid, or the like blended to suppress foaming on the printing ink adhering surface of a foam sheet (made of synthetic resin).

However, in the method using the emboss roll, the concave and convex patterns formed by the emboss roll are shallow in depth and are likely to wear out, thereby giving rise to a problem in that a porcelain-like glossy sheet is unable to be obtained. There is another problem in that when the a foamed sheet is used, since it has foamed portion on the surface, the strength is low and if the printing ink with the foam inhibitor blended is used, the porcelain-like gloss is unable to be obtained.

Therefore, the inventors have proposed a method for manufacturing a sheet with concave and convex patterns precisely formed and with glossiness provided in Japanese Patent No. 1669906 and Japanese Patent No. 1767264. In this method, a long-size base sheet with paste-form resin applied on one side is inserted between a metal cylinder equipped with a heater for gelation and a pressing roll, and is pressed, whereby concave and convex patterns are formed by the concavely carved patterns formed on one of the cylinder and the pressing roll. However, in recent years, demands for gorgeous decorative sheets with still more excellent design characteristics is increased.

BRIEF SUMMARY OF THE INVENTION

The present invention has been devised to solve the above problems. An object of the present invention is to provide a colorful multicolor fused decorative sheet with excellent design characteristics by providing laminated multicolor synthetic resin layers and having concavity and convexity on the whole, as well as to provide a manufacturing method and manufacturing apparatus thereof.

A multicolor fused decorative sheet according to the invention comprises a laminate of a translucent first synthetic resin layer with color and a translucent second synthetic resin layer with color, wherein the first synthetic resin layer differs from the second synthetic resin layer in color and concavities and convexities are formed to form a specified pattern.

The thickness of the first synthetic resin layer and the second synthetic resin layer may be varied relative to each other and/or thickness of each layer may be varied due to the said concavities and convexities.

Because there exist portions with varying thickness of each layer by formation of concavities and convexities, gradation is achieved by the variations of thickness of the first and the second synthetic resin layers when a plurality of colors are fused, and rich colors are presented. Because the first and the second synthetic resin layers have translucence, the surface has glass-like glossiness, and light is reflected and refracted complicatedly at the concave and convex portions. Therefore the sheet surface shines brightly and can give luxurious impressions full of three-dimensional feeling.

The multicolor fused decorative sheet according to this invention comprises a laminate of a first synthetic resin layer with patterns formed by printing and a translucent, colored second synthetic resin layer, wherein the first synthetic resin layer and the second synthetic resin layer have portions with different colors, and concavities and convexities are formed to form specified patterns.

The said first synthetic resin layer may have patterns formed by regular printing. In this case, patterns formed by printing are fused with concave and convex patterns formed on the second synthetic resin layer and the multicolor fused decorative sheet rich in artistic designs can be obtained.

In the said multicolor fused decorative sheet, a third synthetic resin layer with concavities and convexities formed on the surface to form other patterns may be equipped to either of the sides. In this case, in addition to the above-mentioned effects, by the overlap of other patterns, three-dimensionally complicated patterns are formed, resulting in outstanding artistic designs.

When a fourth synthetic resin layer exists in the recessed portion of the third synthetic resin layer, it is possible to provide effects such as coloring, semi-transparency, and so on with this fourth synthetic resin layer existing at part of other patterns, thereby further improving the decorativeness.

When either of the surfaces of the multicolor fused decorative sheet is processed to be flat, it is possible to affix this surface to a flat surface, for example, a mirror, thereby decorating the flat surface gorgeously.

When an adhesive layer is formed on the side processed to be flat, it is possible to use the sheet by affixing to windows, walls, other plates, or sheet-form articles. For example, if it is affixed to a window, sun rays are complicatedly reflected and refracted by the concavities and convexities, and it is possible to easily achieve effects like stained glass.

A method and an apparatus for manufacturing a multi-color fused decorative sheet according to this invention are characterized in that a first paste-form resin is applied to one surface of a first base sheet, a second paste-form resin is applied to one surface of a second base sheet, the first base sheet applied with the first paste-form resin and the second base sheet applied with the second paste-form resin are put together, and pressed to a first impressing body with a first concavity and convexity pattern being formed. Hence, there can be obtained a multicolor fused decorative sheet wherein, a colored first synthetic resin layer and a colored second synthetic resin layer of varying colors respectively are laminated, and concavities and convexities are formed to form a specified pattern.

In addition, the method and the apparatus for manufacturing a multicolor fused decorative sheet according to this invention are characterized in that a third paste-form resin is filed to a second impressing body with a second concavity and convexity pattern being formed, and the third paste-form resin is transferred to the laminated sheet with the first base sheet applied with the first paste-form resin and the second base sheet applied with the second paste-form resin put together by bringing the laminated sheet into contact with the second impressing body filled with the third paste-form resin. With this configuration, it is possible to manufacture a multicolor fused decorative sheet further equipped with a third synthetic resin layer with concavities and convexities formed to form other patterns on either of the surfaces.

The method and the apparatus for manufacturing a multicolor fused decorative sheet according to this invention is, moreover, characterized in that the recessed portion of the second impressing body with the second concavity and convexity pattern is filled with the third paste-form resin, a fourth paste-form resin is applied to the protruded portion of the second impressing body with the said recessed portion filled with the third paste-form resin, and the third paste-form resin and the fourth paste-form resin are transferred to the laminated sheet with the first base sheet applied with the first paste-form resin and the second base sheet applied with the second paste-form resin put together by bringing the laminated sheet in contact with the second impressing body filled with the third paste-form resin and applied with the fourth paste-form resin. Thus, it is possible to manufacture a multicolor fused decorative sheet with the fourth synthetic resin layer additionally located in the recessed portion of the third synthetic resin layer.

The above and further objects and features of the invention will more fully be apparent from the following detailed description with accompanying drawings.

DETAILED DESCRIPTION OF THE INVENTION

Referring now to drawings, there are described preferred embodiments of the present invention.

EMBODIMENT 1

Figure 1:
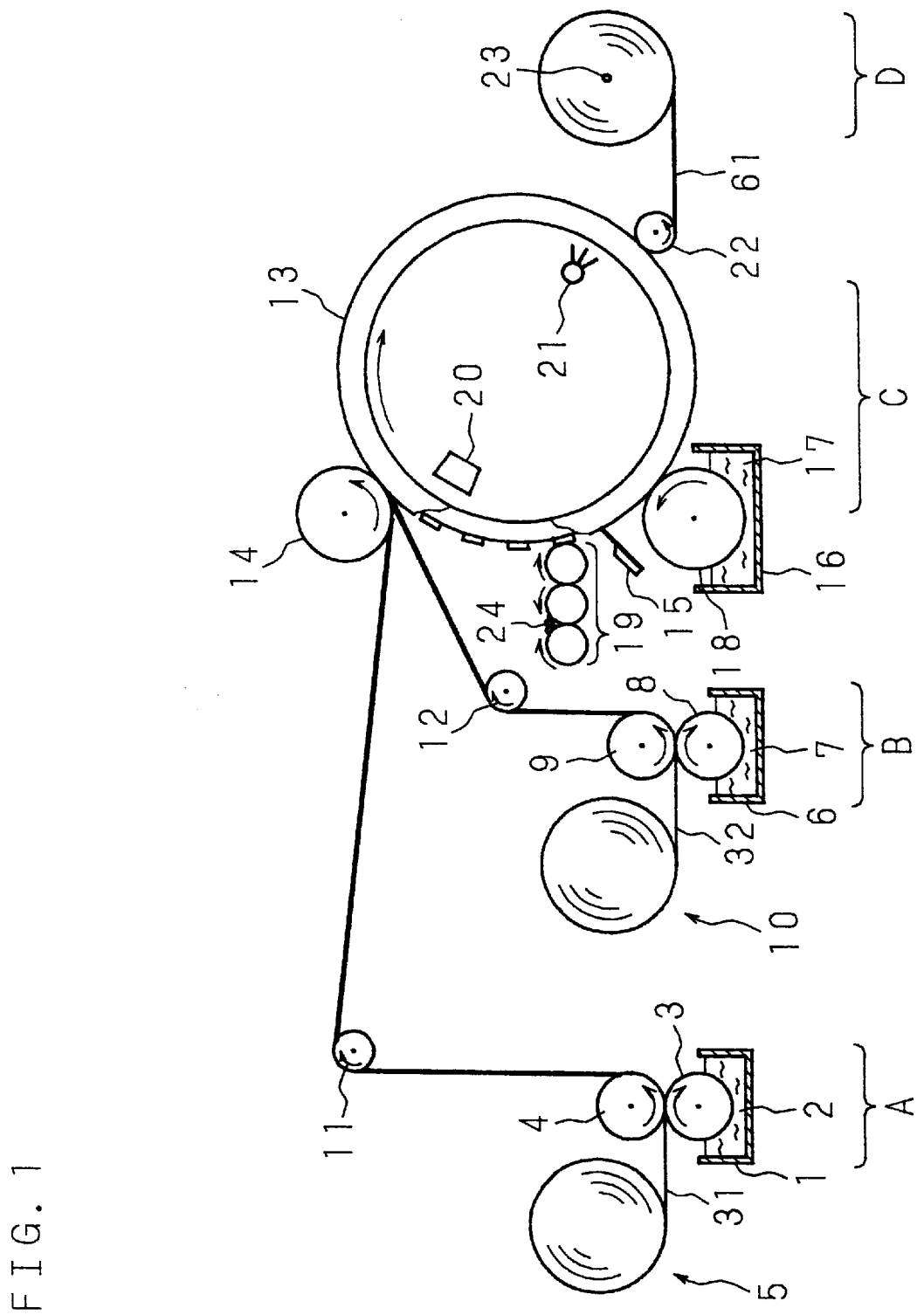
FIG. 1 is a schematic diagram showing a configuration of an apparatus for manufacturing a multicolor fused decorative sheet according to the present invention.

FIG. 1 is a schematic diagram showing a configuration of an apparatus for manufacturing a multicolor fused decorative sheet according to the present invention. In this apparatus, applicating units A, B configured in a similar manner, a concavity and convexity forming unit C, and a winding device D are arranged successively.

Numeral 5 of the applicating unit A denotes a pull-out device for pulling out a long base sheet 31 wound in the form of roll, and on one side thereof, a receiving roll 4 and an applicating roll 3 are placed in pair vertically. Below the applicating roll 3, a storage tank 1 is so disposed for storing a paste-form resin 2 that the lower half of the applicating roll 3 is immersed in the paste-form resin 2.

The applicator B with the similar configuration placed on the side of a applicator A is equipped with a pull-out device 10, a receiving roll 9 and an applicating roll 8 which are placed on one side of the pull-out device 10, and a storage tank 6 for storing a paste-form resin 7 which is placed below the rolls 9 and 8.

Above one side of the receiving roll 4, a guide roll 11 is placed, and above one side of the receiving roll 9, a guide roll 12 is placed at a position lower than the guide roll 11.

The concavity and convexity forming unit C located close to one side of the applicator B has a large-diameter metal cylinder 13 with a large number of specified concavity and convexity patterns formed on a outer surface (or with the smooth outer surface), and a rubber pressing roll 14 with the specified patterns concavely carved on the surface which is disposed close to the applicating unit B side above the metal cylinder 13. In addition, to the applicating unit B side below the metal cylinder 13, an applicating roll 18 is closely placed, and below the applicating roll 18, a storage tank 16 for storing a paste-form resin 17 is so placed that the lower half of the applicating roll 18 is immersed in the paste-form resin 17. Above the applicating roll 18, a doctor blade 15 is arranged for scraping off an excess of the paste-form resin 17 adhering to the outer surface of the metal cylinder 13, and still above it, kneading rolls 19 comprising three rolls closely arranged in a transverse line is provided.

The metal cylinder 13 is made to rotate in the direction shown by the arrow mark in the figure at a specified speed, and in the inside thereof, on the upstream side in a position close to the pressing roll 14 in the rotating direction of the metal cylinder 13, a SCHWANK burner 20, gas heater for heating the inner surface of the metal cylinder 13, is equipped. Similarly, in the inside of the metal cylinder 13, at the position opposite to the SCHWANK burner 20, a cooling device 21 for injecting cooling water over the inner surface of the metal cylinder 13 is installed.

On the winding device D side below the metal cylinder 13 and at the downstream side from the location of the cooling device 21, a separating roll 22 is closely arranged, and on the side of the separating roll 22, a take-up shaft 23 of the winding device D is installed to leave a suitable spacing therebetween.

Now a description will be made on a method for manufacturing the multicolor fused decorative sheet using the apparatus configured as described above.

To the pull-out devices 5, 10, long base sheets 31, 32 made of synthetic resin sheets with flexibility and translucence and wound in a roll form are set, and each storage tank 1, 6, 16 is filled with the paste-form resins 2, 7, 17, respectively. The paste-form resins 2, 7 should be colorless and transparent for one and colored and transparent for the other, or colored in different colors for both and transparent. To the kneading roll 19, a paste-form resin 24 is allowed to adhere.

The base sheets 31, 32 pulled out from the pull-out devices 5, 10, respectively, are allowed to pass between the applicating rolls 3, 8 and receiving rolls 4, 9. Then, these rolls are rotated and each of one side of the surfaces of base sheets 31, 32 is uniformly applied with the paste-form resins 2, 7 via the applicating rolls 3, 8. The base sheets 31, 32 applied with the paste-form resins 2, 7 are transferred to the clearance between the metal cylinder 13 being already rotating and pressing roll 14 via guide rolls 11, 12, respectively.

By the rotation of the metal cylinder 13, the paste-form resin 17 is applied to the outer surface of the metal cylinder 13 via the applicating roll 18, and an excess paste-form resin 17 is scraped off with the doctor blade 15. With this operation, the paste-form resin 17 is filled only into recessed portions 13*b* of the concavity and convexity patterns. By the further rotation of the metal cylinder 13, the paste-form resin 24 kneaded by the kneading rolls 19 is allowed to adhere to protruded portions surface 13*a* of the concavity and convexity patterns. These paste-form resins 17, 24 are heated at the specified temperature (about 180 to 200° C.) by the SHUBANK burner 20 and gelled. On the other hand the base sheets 31, 32 are affixed together at the position where the metal cylinder 13 is close to the pressing roll 14. In this event, the base sheets 31, 32 applied with the paste-form resins 2, 7 are pressed with the pressing force of the pressing roll 14 with the concavely curved patterns formed on the surface, paste-form resins 2, 7 are made to be in layers, and in addition, this concavely carved pattern is formed.

Under this condition, while the paste-form resin 7 contacts the surface of the rotating metal cylinder 13, the paste-form resin 24 adhering to the protruded portions 13*a* and paste-form resin 7 are completely affixed. And by cooling the metal cylinder 13 by the cooling device 21, the paste-form resins 2, 7, 17, 24 are cooled and solidified. With this operation, the paste-form resins 17, 24 become easy to be separated from the metal cylinder 13, and when it passes the separating roll 22, a multicolor fused decorative sheet 61 with these coupled is easily separated from the metal cylinder 13, and taken up by the take-up shaft 23.

Figure 2:
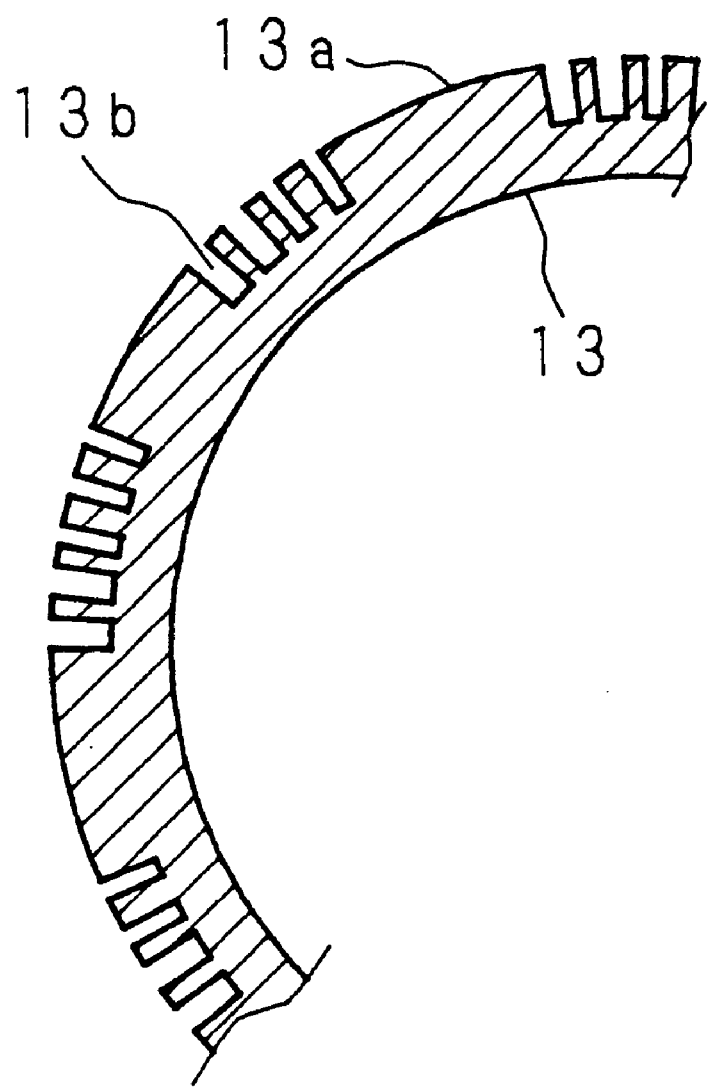
FIG. 2 is a cross-sectional view of a metal cylinder shown in FIG. 1.
Figure 3:
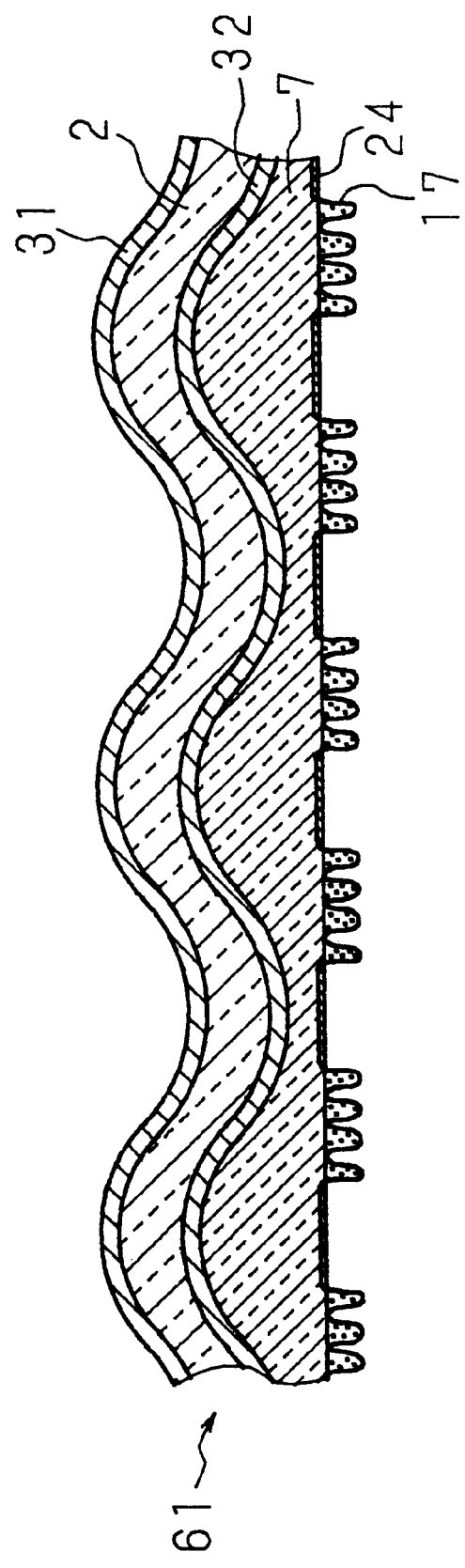
FIG. 3 is a schematic cross-sectional view of a multicolor fused decorative sheet according to Embodiment 1.

FIG. 2 is a enlarged schematic cross-sectional view showing the metal cylinder 13 with concavity and convexity patterns formed on the outer surface. These concavity and convexity patterns have recessed portions 13*b* and the protruded portion surface 13*a* whose surface area is comparatively large and flat. FIG. 3 shows a cross sectional view of the multicolor fused decorative sheet 61 obtained using the metal cylinder 13. To one surface of the substrate 31, the paste-form resin 2 adheres, and to one surface of the base sheet 32, the paste-form resin 7 adheres. These are laminated, and have concavity and convexity patterns corresponding to the surface shape of pressing roll 14. On the surface opposite to the concavity and convexity patterns, concavity and convexity patterns corresponding to the recessed portions 13*b* of the metal cylinder 13 are formed by the paste-form resin 17, and to the bottom of these concavity and convexity patterns which correspond to the protruded portions 13*a* of the metal cylinder 13, the paste-form resin 24 adheres.

Because these exists a portion with varying thickness of each layer by concavities and convexities formed by the pressing roll 14, gradations are presented by changes in each thickness and/or relative thickness of the paste-form resin 2 and the paste-form resin 7 with fused multicolor, and the sheet looks colorful. In addition, because the sheet has light transmittance, the sheet has glassy luster, and because light is complicatedly reflected and refracted at the concavity and convexity portions, the sheet shines beautifully, thereby giving a gorgeous impression with a rich three-dimensional look.

With the overlaps of patterns of the paste-form resin 17, three-dimensionally complicated patterns are formed. In addition, by the paste-form resin 24 existing in part of the patterns of the paste-form resin 17, it is possible to exert effects such as coloring or semi-transparency, and the like, thereby further increasing the decorativeness.

EMBODIMENT 2

An apparatus the same as that shown in FIG. 1 or an apparatus without the kneading rolls 19 is used. When the apparatus shown in FIG. 1 is used, it is used with the kneading roll 19 free of adhering paste-form resin.

Figure 4:
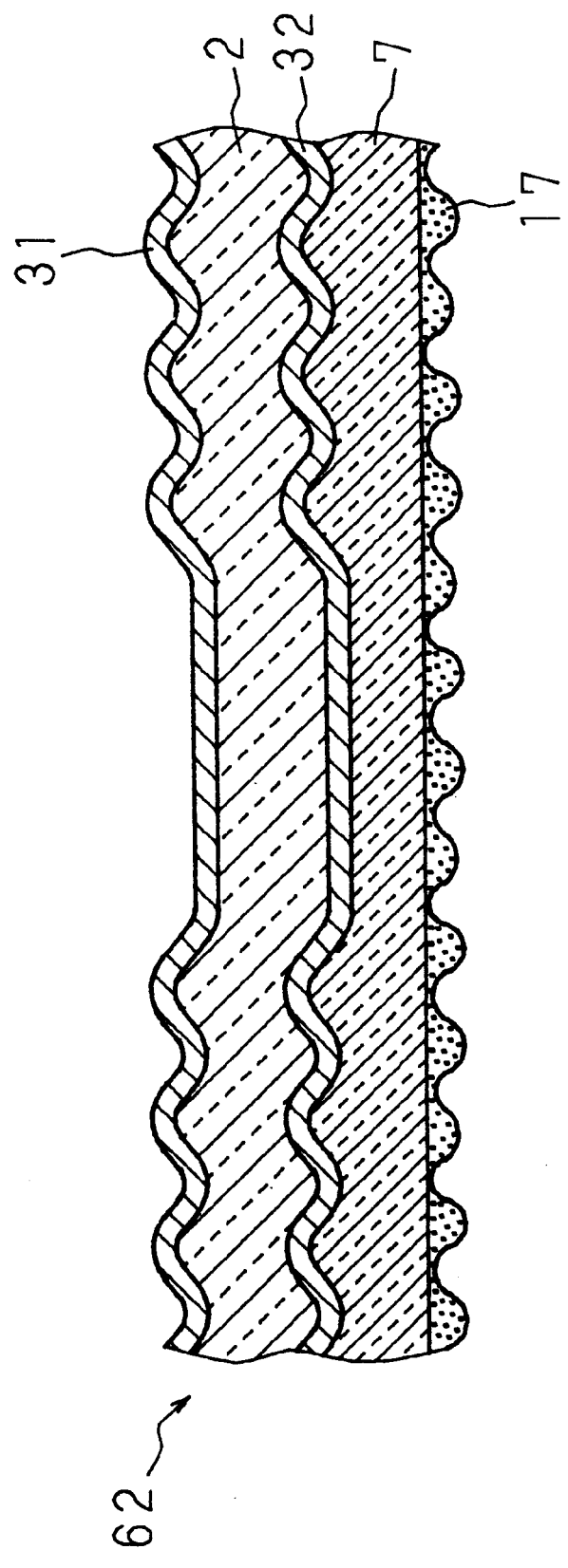
FIG. 4 is a schematic cross-sectional view of a multicolor fused decorative sheet according to Embodiment 2.

When the apparatus is operated in the same manner as in the case of Embodiment 1, a multicolor fused decorative sheet 62 as shown in FIG. 4 can be obtained. That is, on one surface of the base sheet 31, the paste-form resin 2 adheres, while to one surface of the base sheet 32, the paste-form resin 7 adheres. And these are laminated, and concavity and convexity patterns corresponding to the surface form of the pressing roll 14 are formed. On the surface opposite to the concavity and convexity patterns, concavity and convexity patterns corresponding to the recessed portion 13*b* of the metal cylinder 13 are formed with the paste-form resin 17, to which no paste-form resin 24 adheres.

As described above, since portions with varying thickness at each layer exist because of the formation of concavities and convexities by the pressing roll 14, gradation is achieved by the change in thickness of the paste-form resin 2 and paste-form resin 7 and the sheet looks colorful when a plurality of colors are fused. In addition, because the sheet possesses translucence, the surface possesses glass-like luster, and light is reflected and refracted complicatedly at the concavity and convexity portions and the sheet shines brightly, thereby achieving a gorgeous impression full of a three-dimensional look.

With the overlaps of patterns of the paste-form resin 17, three-dimensional complicated patterns are formed.

EMBODIMENT 3

An apparatus the same as that shown in FIG. 1 or an apparatus not equipped with the kneading roll 19, applicating roll 18, storing tank 16, and doctor blade 15 but equipped with a metal cylinder 13 with a smooth outer surface is used. When the apparatus shown in FIG. 1 is used, the equipment shall be used with the kneading rolls 19 free of the paste-form resin 24 and the storing tank 16 not filled with paste-form resin 17.

Figure 5:
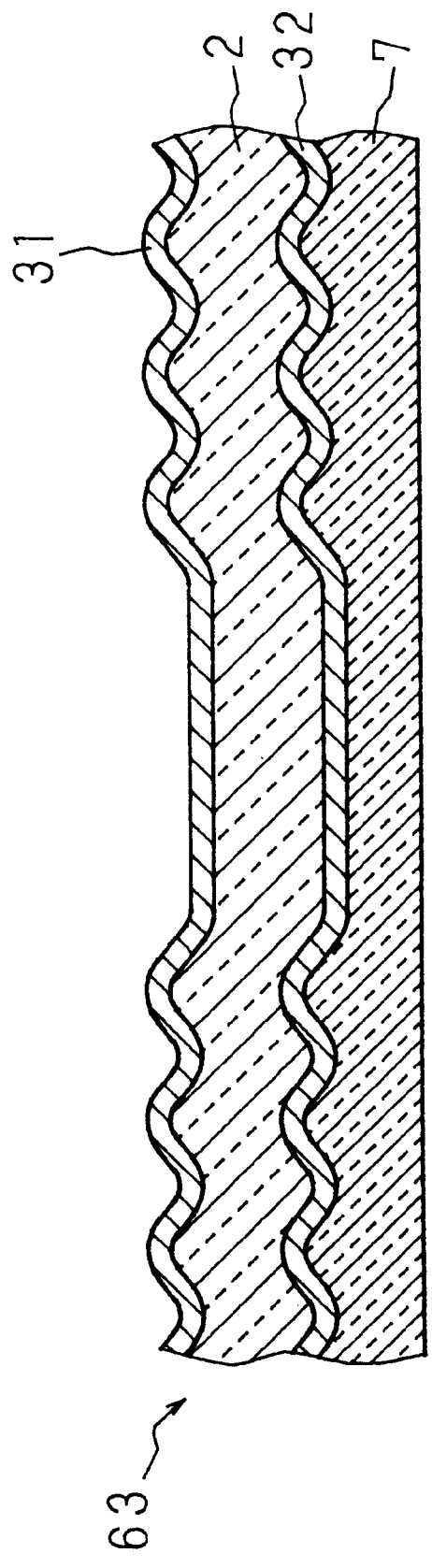
FIG. 5 is a schematic cross-sectional view of a multicolor fused decorative sheet according to Embodiment 3.

When either apparatus is operated in the same manner as in the case of Embodiment 1, a multicolor fused decorative sheet 63 as shown in FIG. 5 is obtained. That is, on one surface of the base sheet 31, paste-form resin 2 adheres, while on one surface of the base sheet 32, paste-form resin 7 adheres. These are laminated and concavity and convexity patterns corresponding to the surface form of the pressing roll 14 are formed. On the surface of the paste-form resin 7 side, nothing is formed.

As described above, since the thickness of each layer varies by the formation of concavities and convexities by the pressing roll 14, the sheet surface achieves gradation and looks colorful because of the changes in thickness of the paste-form resin 2 and the paste-form resin 7. In addition, since the sheet has light transmittance, the sheet possesses glass-like luster, and light is complicated reflected and refracted at the concavity and convexity portions to allow the surface to shine brightly, giving a gorgeous impression full of three-dimensional look.

EMBODIMENT 4

Figure 6:
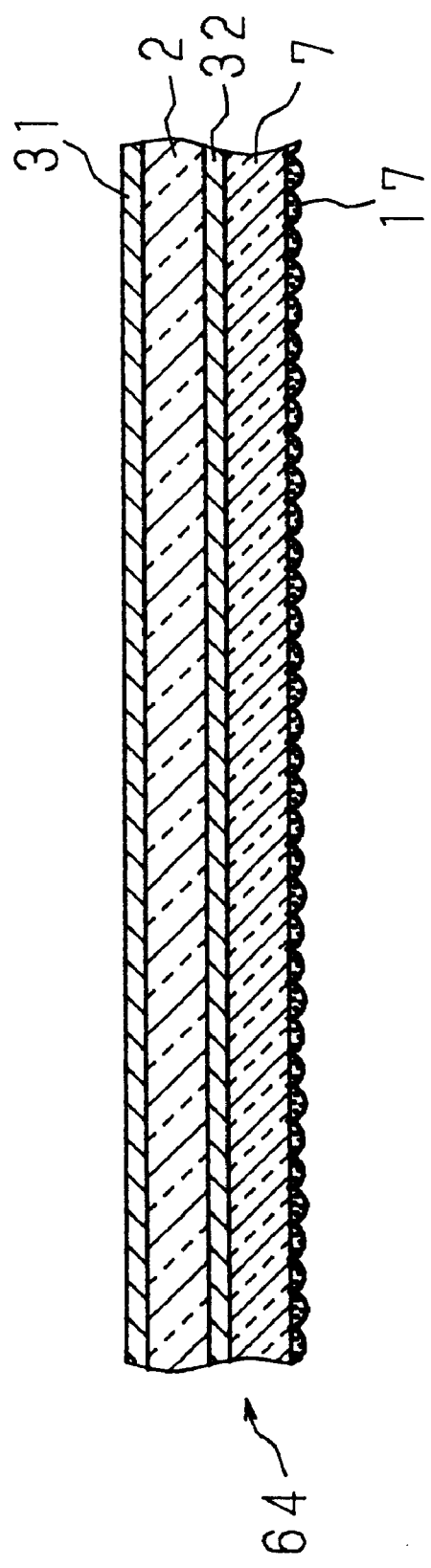
FIG. 6 is a schematic cross-sectional view of a multicolor fused decorative sheet according to Embodiment 4.

In a configuration same as that of Embodiment 2, a pressing roll 14 with a smooth surface is used. When the apparatus is operated in the same manner as in the case of Embodiment 1, a multicolor fused decorative sheet 64 as shown in FIG. 6 can be obtained. That is, the paste-form resin 2 adheres on one surface of the base sheet 31, while the paste-form resin 7 adheres on one surface of the base sheet 32. And these are laminated, are flat, and are not formed with concavity and convexity patterns. On the surface of this paste-form resin 7, the concavity and convexity patterns corresponding to the recessed portions 13*b* of the metal cylinder 13 are formed with the paste-form resin 17.

With the overlaps with the paste-form resin 7 and that 17 adhering below, beautiful patterns that look three-dimensional are formed, and a glassy luster is provided.

EMBODIMENT 5

An apparatus with the doctor blade 15 and the kneading rolls 19 removed from the equipment used in Embodiment 1 is used and a pressing roll 14 with a smooth surface is used. And the applicating roll 18 is installed in such a manner so as to strongly press against the metal cylinder 13.

Figure 7:
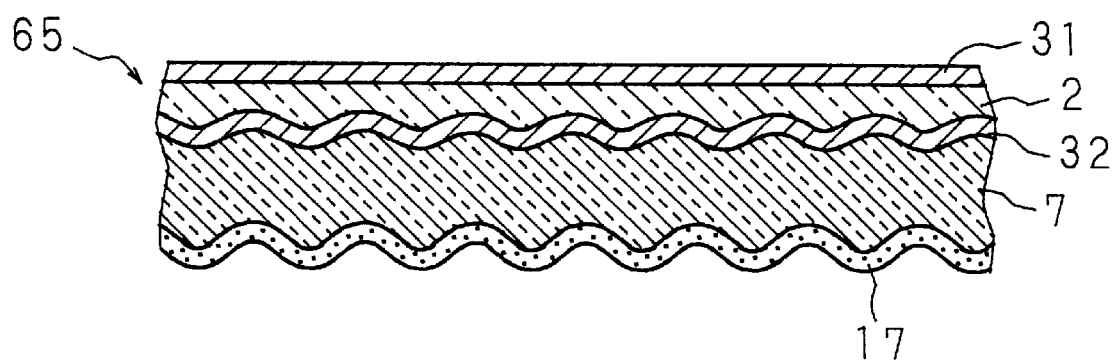
FIG. 7 is a schematic cross-sectional view of a multicolor fused decorative sheet according to Embodiment 5.

When the equipment is operated in the same manner as in the case of Embodiment 1, a multicolor fused decorative sheet 65 as shown in FIG. 7 can be obtained. That is, on one surface of the base sheet 31, paste-form resin 2 adheres, while on one surface of the base sheet 32, the paste-like resin 7 adheres. On the surface of the paste-like resin 7 side, concavity and convexity patterns corresponding to the recessed portions 13*b* of the metal cylinder 13 are formed with the paste-form resin 17. These are laminated and the base sheet 31 side is flat and is transformed into the concavity and convexity patterns of the metal cylinder 13 gradually toward the surface on the opposite side (paste-form resin 17 side).

The paste-form resin 17 adheres throughout the full uneven surface of the metal cylinder 13 by strongly pressing the applicating roll 18 against the metal cylinder 13 and without scraping it with the doctor blade 15. In addition, in actuality, the adhering amount subtly varies, and the paste-form resin 17 adheres less at the protruded portions 13*a* and more at the corners in the recessed portions 13*b*. With this, the colors different from those with sheets affixed are presented, and a multicolor fused decorative sheet with remarkably excellent design characteristic can be obtained.

EMBODIMENT 6

An apparatus with one applicating device A (or B) removed from the apparatus used in Embodiment 1 is used. Or no base sheet 31 (32) is provided to one pull-out device 5 (10).

And to the other pull-out device 10, the sheet with patterns already printed is set as the base sheet 32, and the process thereafter is performed in the same manner.

In this embodiment, the patterns already printed overlap with concavity and convexity patterns by the paste-form resin 7, and a complicated and colorful multicolor fused decorative sheet can be obtained.

EXAMPLE 1

Using a following materials, the multicolor fused decorative sheet 63 corresponding to Embodiment 3 was prepared. Table 1 shows the blending ratio of paste-form resins 2, 7.

Substrate sheets 31, 32 . . . 0.08-mm-thick colorless transparent polyvinyl chloride sheet Paste-form resin 2 . . . yellow transparent polyvinyl chloride paste-form resin (composition 1)

Paste-form resin 7 . . . blue transparent polyvinyl chloride paste-form resin (composition 2)

Pressing roll 14 . . . concavity and convexity patterns of fish, shells, and so on.

[TABLE 1]

Figure 8:
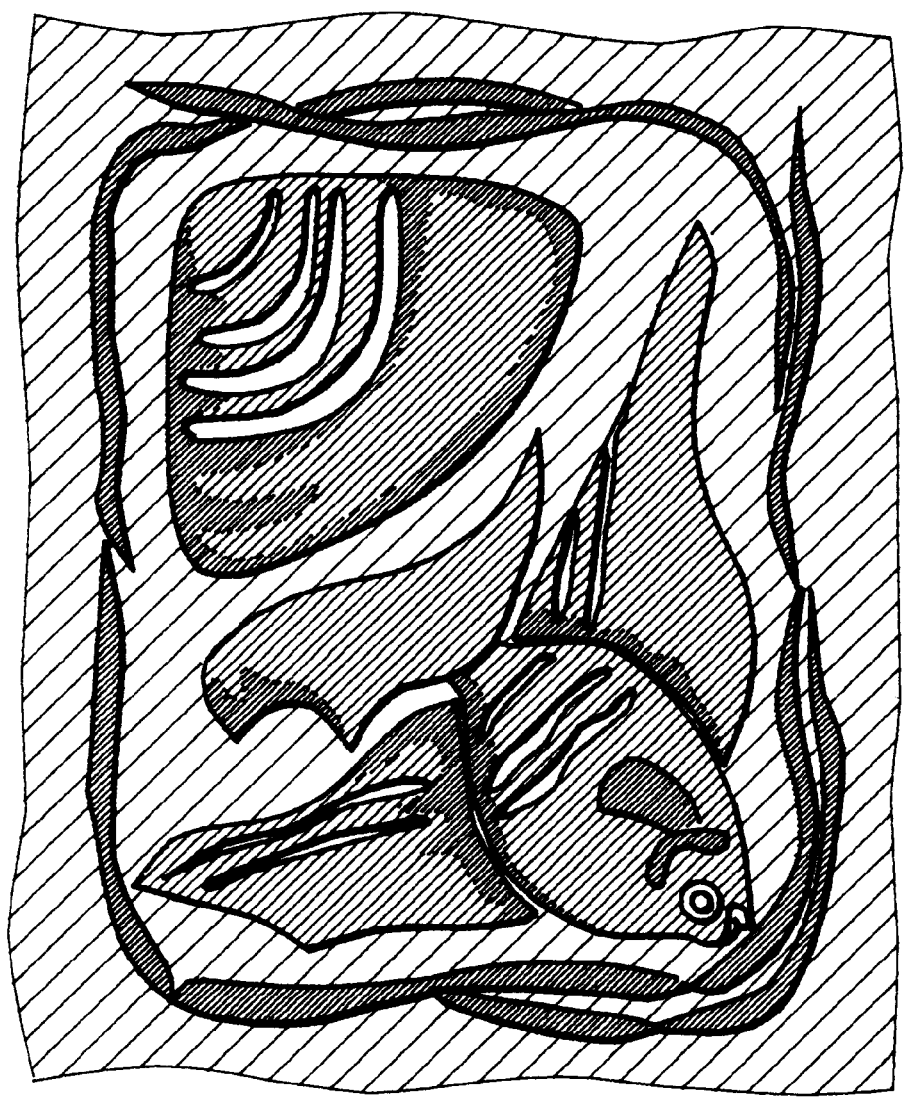
FIG. 8 is a plan view of a multicolor fused decorative sheet according to Example 1.

FIG. 8 shows a plan view of the multicolor fused decorative sheet 63 in this Example. Patterns such as fish, shells, and so on were not only formed to be three-dimensionally raised but also the yellow paste-form resin 2 and the blue paste-form resin 7 were fused to present complicated colors. By changing the application thickness of the paste-form resins 2, 7 variously at the time of pressing, the fish and the shell patterns appeared green, more yellowish, or more bluish, and colors varied gradually. And by the light reflection and refraction at the concavity and convexity portions, the sheet possessed a luster like a beautiful piece of glass work, and a multicolor fused decorative sheet 63 with superb artistic design was obtained.

And blocks as shown in FIG. 8 were arranged in the form of lattice, and the sheet was cut to a 180 cm by 180 cm size to be used as a shower curtain. With this operation, a glassy and colorful beautiful shower curtain with light complicated refracted and brightly shining was obtained.

By providing an adhesive layer on the flat surface on the paste-form resin 7 side using a known technique, the sheet was made into a window affixed sheet. When this sheet is affixed to the window, the color with yellow and blue fused shone like a beautiful piece of glass work by light transmission and refraction, and the window was able to be gorgeously decorated. When this kind of multicolor fused decorative sheet is affixed to a window, it can have glass scattering prevention effects when the glass is broken.

EXAMPLE 2

Using a following materials, the multicolor fused decorative sheet 62 corresponding to Embodiment 2 was prepared. Table 1 shows the blending ratios of paste-form resins 2, 7, 17.

Base sheets 31, 32 . . . 0.08-mm-thick colorless transparent polyvinyl chloride sheet Paste-form resin 2 . . . yellow transparent polyvinyl chloride paste-form resin (composition 1)

Paste-form resin 7 . . . blue transparent polyvinyl chloride paste-form resin (composition 2)

Paste-form resin 17 . . . white semi-transparent polyvinyl chloride paste-form resin (composition 3)

Metal cylinder 13 . . . wave patterns

Pressing roll 14 . . . concavity and convexity patterns of fish, shells, and so on.

Figure 9:
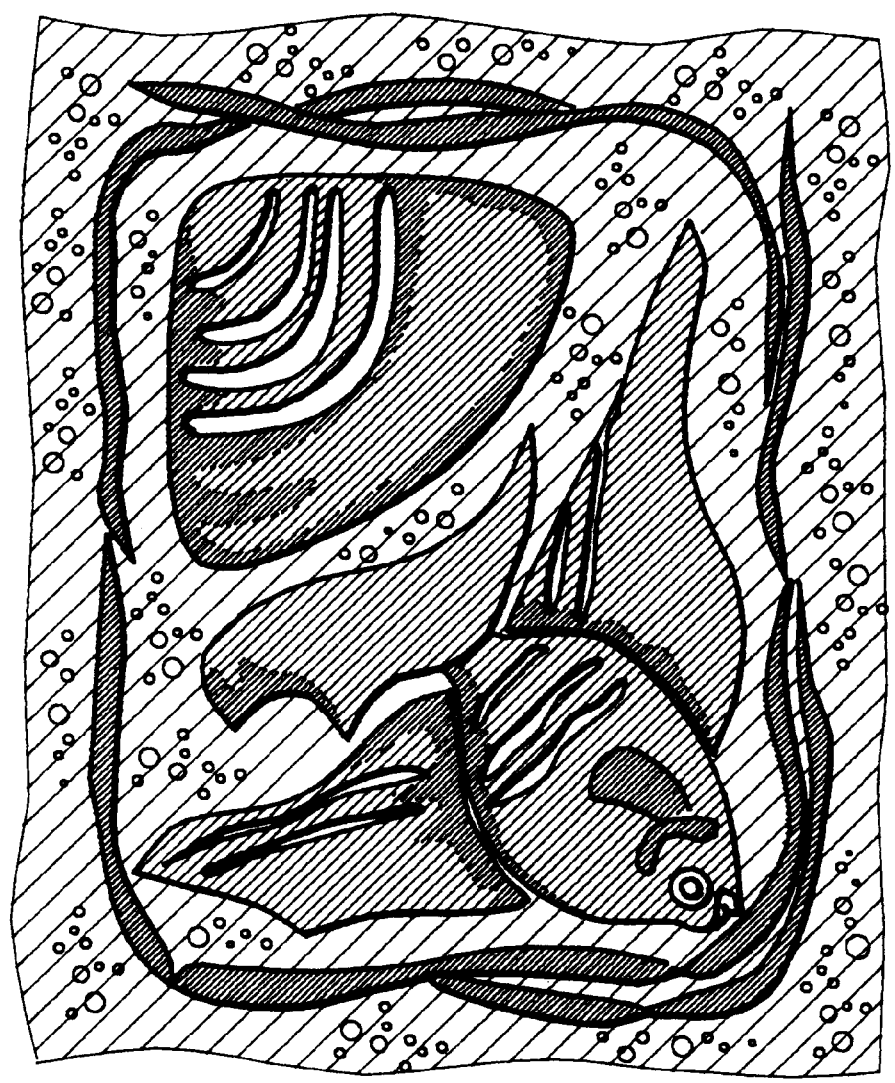
FIG. 9 is a plan view of a multicolor fused decorative sheet according to Example 2.

In this Example, in addition to the effects the same as those of Example 1, fish and shell patterns presenting green-yellow-blue with the yellow paste-form resin 2 and blue paste-like resin 7 fused overlaps with white wave patterns shone by light reflection and refraction (FIG. 9), and multicolor fused decorative sheet 62 still more gorgeous than the multicolor fused decorative sheet 63 of Example 1 was obtained.

EXAMPLE 3

Using the following materials, the multicolor fused decorative sheet 65 corresponding to Embodiment 5 was prepared. Table 1 shows the blending ratios of paste-form resins 2, 7, 17.

Base sheets 31, 32 . . . 0.08-mm-thick colorless transparent polyvinyl chloride sheet Paste-form resin 2 . . . pale red transparent polyvinyl chloride paste-form resin (composition 4)

Paste-form resin 7 . . . yellow transparent polyvinyl chloride paste-form resin (composition 1)

Paste-form resin 17 . . . white translucent polyvinyl chloride paste-form resin (composition 3)

Metal cylinder 13 . . . flower patterns

Pressing roll 14 . . . smooth (no patterns)

Figure 10:
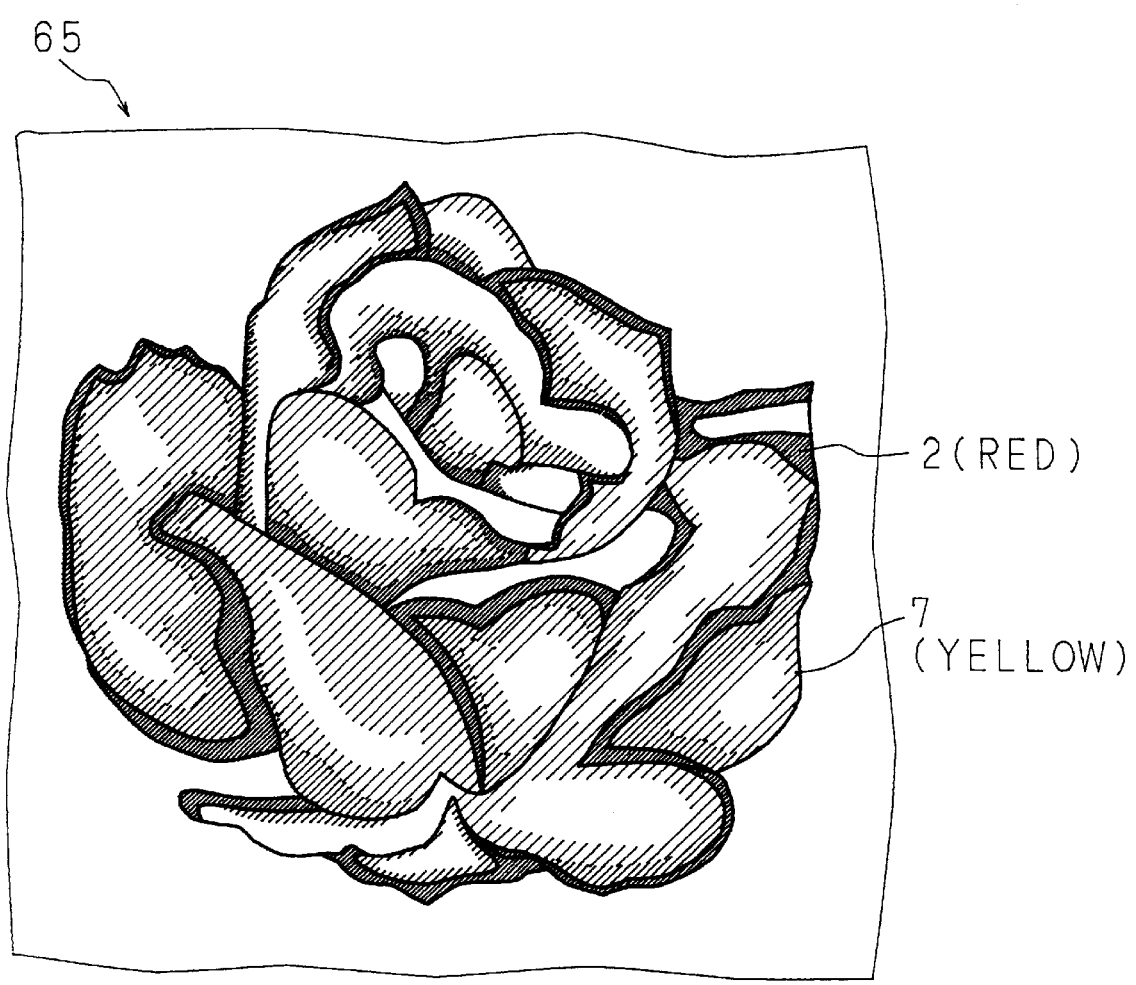
FIG. 10 is a plan view of a multicolor fused decorative sheet according to Example 3.

The pale red paste-form resin 2 was applied comparatively generously to the base sheet 31, and the yellow paste-form resin 7 was applied comparatively less to the base sheet 32. The plan of the multicolor fused decorative sheet 65 in this Example is shown in FIG. 10. The outline portion of the flower pattern presented predominantly red with the thick paste-form resin 2 corresponding to deep recessed portion 13b of the metal cylinder 13, and the petal portion presented partially yellow with the partially thin portion of the paste-form resin 2 corresponding to shallow recessed portion 13b. And the intermediate portion presented orange thereby giving colorful gradations, and in addition, by the thickness of the paste-form resins 2, 7, the color by the white semi-transparent paste-form resin 17 looked differently, and the multicolor fused decorative sheet 65 with superb ornamentalness was obtained.

EXAMPLE 4

Using the following materials, another multicolor fused decorative sheet 62 corresponding to Embodiment 2 was prepared. In this Example, concavity and convexity patterns are formed on the surfaces of the applicating rolls 3, 8. Table 1 shows the blending example of paste-form resins 2, 7.

Base sheets 31, 32 . . . 0.08-mm-thick colorless transparent polyvinyl chloride sheet Paste-form resin 2 . . . yellow transparent polyvinyl chloride paste-form resin (composition 1)

Paste-form resin 7 . . . blue transparent polyvinyl chloride paste-form resin (composition 2)

Metal cylinder 13 . . . matte finish on the whole surface

Pressing roll 14 . . . grain-form texture

On the surface of the applicating roll 3, recessed portions were formed in the shape of stripes at 5 cm intervals, and on the surface of the applicating roll 8, recessed portions were formed in the shape of stripes at 5 cm intervals. Using this kind of applicating roll 3, the yellow paste-form resin 2 was applied with thin, thick, thin, thick, . . . regions formed in the shape of stripes in correspondence with the surface form of the applicating roll 3. Similarly, the blue paste-form resin 7 was applied with thin, thick, thin, thick, . . . regions formed in the shape of stripes by the applicating roll 8. The "thick" portions of these yellow paste-form resin 2 and blue paste-form resin 7 were designed to appear alternately.

Figure 11:
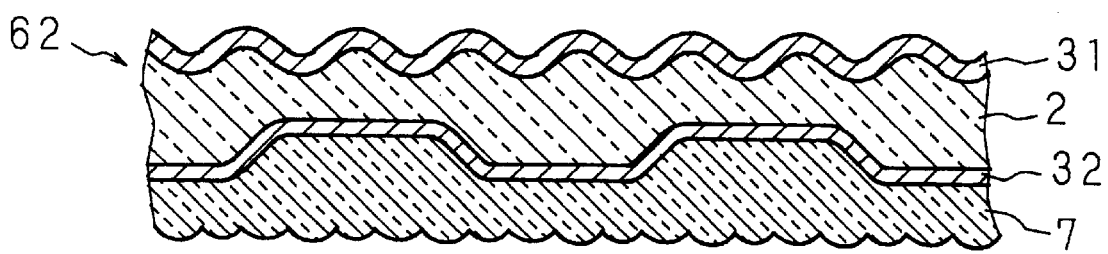
FIG. 11 is a schematic cross-sectional view of a multicolor fused decorative sheet according to Example 4.

FIG. 11 shows a cross-sectional view of the multicolor fused decorative sheet 62 in this Example. The blue paste-form resin 7 enters matte-finish concavities and convexities on the surface of the metal cylinder 13, while the yellow paste-form resin 2 enters grain-form concavities and convexities on the surface of the pressing roll 14. And by fusing blue and yellow in the thickness at the ratio of the two kinds of color, 5-cm-wide stripes with yellowish green and bluish green were formed, with the boundary portion presenting the gradation of the intermediate colors. And a beautiful multicolor fused decorative sheet 62 with the matte finish surface on one side and grain patterns on the other side was obtained. With the grain-form unevenness formed on the other side, the crisp touch was able to be obtained when the sheet was made into a shower curtain.

The multicolor fused decorative sheets according to this invention as described above present gradations and look colorful by the changes in thickness of the first synthetic resin layer and the second synthetic resin layer when a plurality of colors are fused because there exist portions with varying thickness of each layer by the formation of irregularities. In addition, since the sheet has translucence, it has glass-like luster, brightly shines because the light is complicatedly reflected and refracted at concavity and convexity portions, and a gorgeous impression with a full three-dimensional look can be obtained. The method and the apparatus for manufacturing of the present invention can manufacture such multicolor fused decorative sheets.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

TABLE 1

| | COMBI-NATION 1 | COMBI-NATION 2 | COMBI-NATION 3 | COMBI-NATION 4 |
|---|---|---|---|---|
| TOSO Co. Ltd MADE R-890 | 100 | 100 | 100 | 100 |
| SEKISUI KAGAKU Co. Ltd MADE DOP | 40~55 | 40~55 | 40~55 | 40~55 |
| KATUDA KAKO Co. Ltd MADE BZ-100CJ | 1.5~3.0 | 1.5~3.0 | 1.5~3.0 | 1.5~3.0 |
| KATUDA KAKO Co. Ltd MADE ABC-18J | 0.5~1.0 | 0.5~1.0 | 0.5~1.0 | 0.5~1.0 |
| TOYO INK SEIZO Co. Ltd. MADE TV-1162 (YELLOW) | 0.1~1.0 | — | — | — |
| TOYO INK SEIZO Co. Ltd. MADE TV-1620 (BLUE) | — | 0.1~1.0 | — | — |
| TOYO INK SEIZO Co. Ltd. MADE TV-6945 (WHITE) | — | — | 0.1~1.0 | — |
| TOYO INK SEIZO Co. Ltd. MADE TV-2163 (RED) | — | — | — | 0.1~1.0 |

(WEIGHT PARTS)

What is claimed is:

1. A fused translucent decorative sheet, comprising a laminate of:

a first translucent base sheet;

a first synthetic resin layer adhered to one surface of said first base sheet;

a second translucent base sheet adhered to a surface of said first synthetic resin layer; and a second synthetic resin layer adhered to a surface of said second base sheet;

wherein one of said first and second synthetic resin layers is colorless and transparent and the other layer is colored and transparent or both of said layers are colored and transparent and wherein said fused decorative sheet has first and second surfaces and one of said first and second surfaces has a first pattern of concavities and convexities thereon.

2. The fused translucent decorative sheet of claim 1, wherein a third synthetic resin layer having a second pattern of concavities and convexities is formed on the other of said first and second surfaces.

3. A fused translucent decorative sheet, comprising a laminate of:
   a first translucent base sheet;
   a first synthetic resin layer adhered to one surface of said first base sheet;
   a second translucent base sheet adhered to a surface of said first synthetic resin layer; and
   a second synthetic resin layer adhered to a surface of said second base sheet;
   wherein one of said first and second synthetic resin layers is colorless and transparent and the other layer is colored and transparent or both of said layers are colored and transparent and wherein said fused decorative sheet has first and second surfaces and a third synthetic resin layer having a pattern of concavities and convexities is formed on one of said first and second surfaces.

4. The fused translucent decorative sheet of claim 2, wherein recessed portions of said concavities and convexities of said third synthetic resin layer have a fourth synthetic resin layer formed therein.

5. The fused translucent decorative sheet of claim 3, wherein recessed portions of said concavities and convexities of said third synthetic resin layer have a fourth synthetic resin layer formed therein.

6. A fused translucent decorative sheet, formed by a process comprising:
   applying a first paste-form resin to a surface of a first translucent base sheet;
   applying a second paste-form resin to a surface of a second translucent base sheet; and
   joining the first base sheet with the first paste-form resin applied thereon and the second translucent base sheet with the second paste-form resin applied thereon such that said first paste-form resin is in contact with a surface of said second translucent base sheet to form a laminate; and
   pressing the laminate between a first impressing body having a surface formed with a first concavity and convexity pattern and a second impressing body to form said fused decorative sheet having first and second surfaces and a pattern of concavities and convexities formed on at least one of said first and second surfaces.

7. A fused translucent decorative sheet, formed by a process comprising:
   applying a first paste-form resin to a surface of a first translucent base sheet;
   applying a second paste-form resin to a surface of a second translucent base sheet; and
   joining the first base sheet with the first paste-form resin applied thereon and the second translucent base sheet with the second paste-form resin applied thereon such that said first paste-form resin is in contact with a surface of said second translucent base sheet to form a laminate; and
   pressing the laminate between a first impressing body and a second impressing body, said second impressing body having formed on the surface thereof a pattern of concavities and convexities and a third paste-form resin applied thereto, to transfer said third paste-form resin to said laminate and form said fused decorative sheet having first and second surfaces and a synthetic resin layer having a pattern of concavities and convexities formed from said third paste-form resin on at least one of said first and second surfaces.

8. A fused translucent decorative sheet, formed by a process comprising:
   applying a first paste-form resin to a surface of a first translucent base sheet;
   applying a second paste-form resin to a surface of a second translucent base sheet; and
   joining the first base sheet with the first paste-form resin applied thereon and the second translucent base sheet with the second paste-form resin applied thereon such that said first paste-form resin is in contact with a surface of said second translucent base sheet to form a laminate; and
   pressing the laminate between a first impressing body having a surface formed with a first concavity and convexity pattern and a second impressing body having formed on the surface thereof a pattern of concavities and convexities and a third paste-form resin applied thereto, to transfer said third paste-form resin to said laminate and to form said fused decorative sheet having first and second surfaces with a pattern of concavities and convexities formed on said first surface and a synthetic resin layer having a pattern of concavities and convexities formed from said third paste-form resin on said second surface.

9. A fused translucent decorative sheet according to claim 7, wherein:
   a fourth paste-form resin is formed on protruding portions of the concavities and convexities of said second impressing body, the concavities of which are filled with said third paste-form resin; to transfer said third paste-form resin and said fourth paste-form resin to said laminate and form said synthetic resin layer having a pattern of concavities and convexities from said third paste-form resin and to form a synthetic resin layer from said fourth paste-form resin in recessed portions of said pattern of concavities and convexities in said synthetic resin layer formed from said third paste-form resin.

10. A fused translucent decorative sheet according to claim 8, wherein:
    a fourth paste-form resin is formed on protruding portions of the concavities and convexities of said second impressing body, the concavities of which are filled with said third paste-form resin; to transfer said third paste-form resin and said fourth paste-form resin to said laminate and form said synthetic resin layer having a pattern of concavities and convexities from said third paste-form resin and to form a synthetic resin layer from said fourth paste-form resin in recessed portions of said pattern of concavities and convexities in said synthetic resin layer formed from said third paste-form resin.

11. The fused translucent decorative sheet of claim 1, wherein the first translucent base sheet and the second translucent base sheet each independently comprises a polyvinyl chloride resin.

12. The fused translucent decorative sheet of claim 1, wherein the first synthetic resin layer and the second synthetic resin layer each independently comprises a polyvinyl chloride resin.

13. The fused translucent decorative sheet of claim 3, wherein the first translucent base sheet and the second translucent base sheet each independently comprises a polyvinyl chloride resin.

14. The fused translucent decorative sheet of claim 3, wherein the first synthetic resin layer, the second synthetic resin layer and the third synthetic resin layer each independently comprises a polyvinyl chloride resin.

15. The fused translucent decorative sheet of claim 6, wherein the first translucent base sheet and the second translucent base sheet each independently comprises a polyvinyl chloride resin.

16. The fused translucent decorative sheet of claim 6, wherein the first paste-form resin and the second paste-form resin each independently comprises a polyvinyl chloride resin.

17. The fused translucent decorative sheet of claim 7, wherein the first translucent base sheet and the second translucent base sheet each independently comprises a polyvinyl chloride resin.

18. The fused translucent decorative sheet of claim 7, wherein the first paste-form resin, the second paste-form resin and the third paste-form resin each independently comprises a polyvinyl chloride resin.

19. The fused translucent decorative sheet of claim 8, wherein the first translucent base sheet and the second translucent base sheet each independently comprises a polyvinyl chloride resin.

20. The fused translucent decorative sheet of claim 8, wherein the first paste-form resin, the second paste-form resin and the third paste-form resin each independently comprises a polyvinyl chloride resin.

* * * * *